Sept. 3, 1957 B. V. STEVENS 2,804,800
EPISCOPIC OPTICAL SYSTEM FOR CONTOUR PROJECTOR
Filed July 30, 1954 2 Sheets-Sheet 1

Bert V. Stevens
INVENTOR.

BY

ATTORNEYS

Sept. 3, 1957   B. V. STEVENS   2,804,800
EPISCOPIC OPTICAL SYSTEM FOR CONTOUR PROJECTOR
Filed July 30, 1954   2 Sheets-Sheet 2
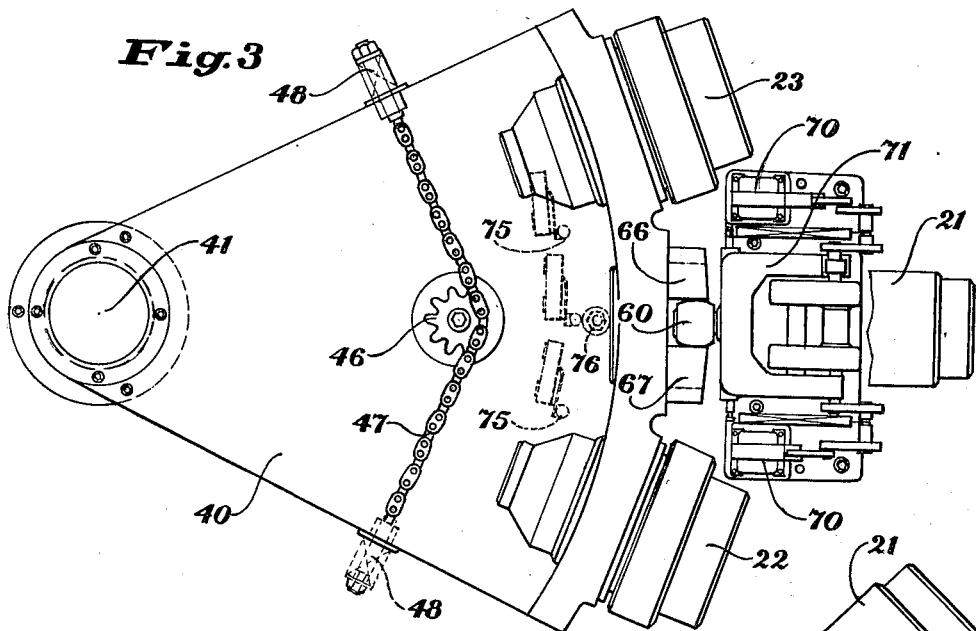
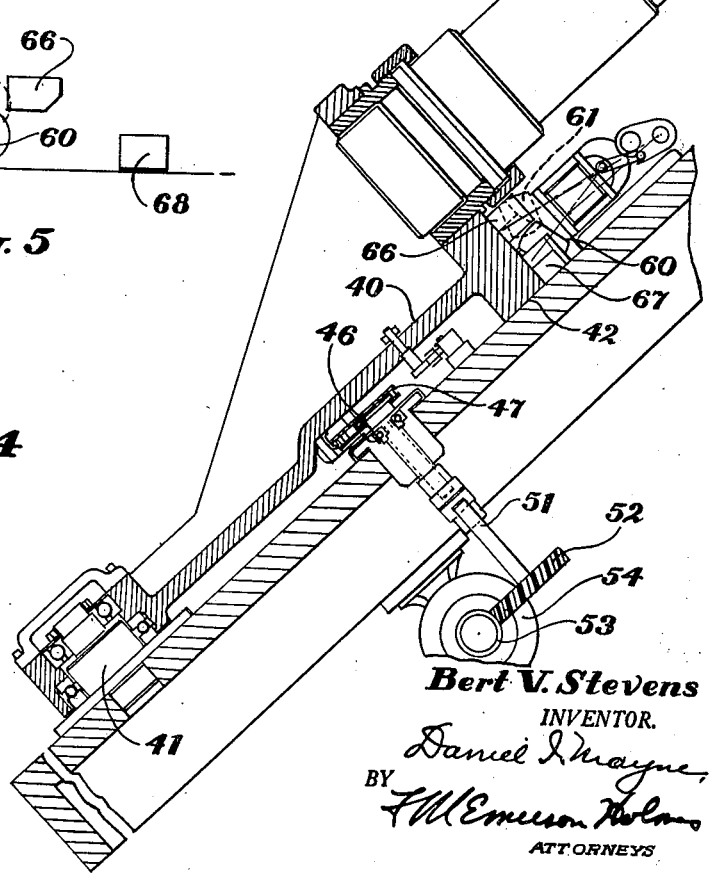
Bert V. Stevens
INVENTOR.
ATTORNEYS

United States Patent Office 2,804,800
Patented Sept. 3, 1957

2,804,800

EPISCOPIC OPTICAL SYSTEM FOR CONTOUR PROJECTOR

Bert V. Stevens, Rochester, N. Y., assignor to Eastman Kodak Company, Rochester, N. Y., a corporation of New Jersey Application July 30, 1954, Serial No. 446,826

2 Claims. (Cl. 88—24)

This invention relates to contour projectors of the type commonly used in machine tool manufacture for the examination of small parts. It relates particularly to contour projectors in which the object under examination may be illuminated episcopically.

It is the object of the invention to provide an optical system for efficient episcopic illumination particularly for use in those systems which project a telecentric image of the object. Telecentric projection is normally obtained by having an objective or a series of objectives in which the effective stop or aperture is located in the focal plane of the objective.

According to the present invention the effective stop of the telecentric system is a small spot mirror oblique to the optic axis and located in the rear focal plane of the first objective which receives light from the object. The area of this reflector is less than that of the objective and the reflector acts as the telecentric stop of the objective as it reflects the light through the rest of the optical system to a screen. The objective may be the only one in the system or it may be a relay lens or part of a relay lens forming an aerial image which is then focused by another objective on the screen. A lamp (with or without mirrors and condenser lenses) is arranged, according to the invention, to send a beam of light annularly around this reflector spot and through the first objective of the system to illuminate the object episcopically.

The reflector spot is preferably a metallic coating on the front surface of a sheet of glass. This very simple construction provides a precise arrangement for the telecentric projection of light and the maximum efficiency of episcopic illumination.

The operation of the invention will be more fully understood from the following description when read in connection with the accompanying drawings in which:

Fig. 3 is a plan view, partly broken away, of the lens turret which is shown mounted on a diagonal in Fig. 1;

Fig. 4 is a vertical section of this lens turret; and

Fig. 5 illustrates the operation of the mechanical stops associated with the lens turret.

Figure 1:
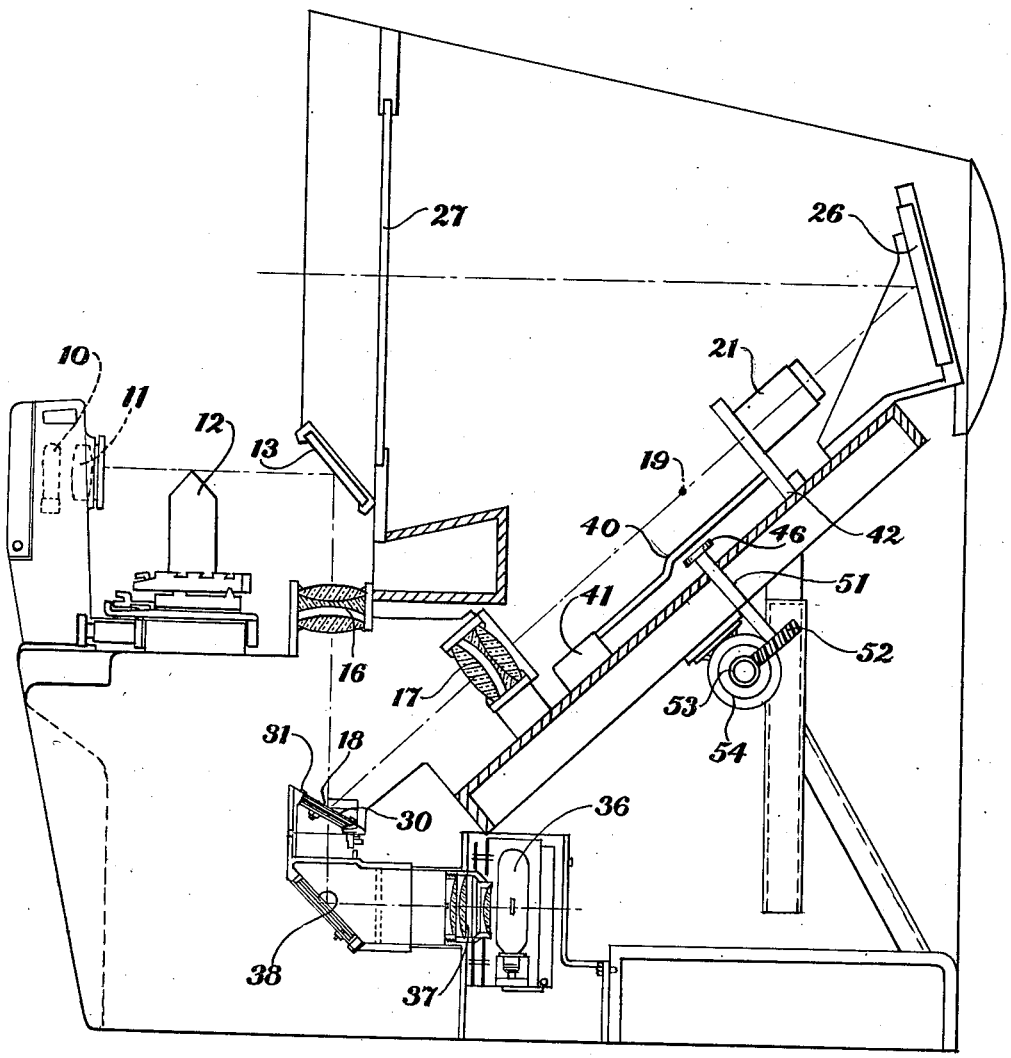
Fig. 1 is a vertical section, partly schematic of an optical system incorporating a preferred embodiment of the invention.

In Fig. 1 light from a lamp 10 through a condenser 11 illuminates an object 12 to provide a shadow image thereof. The present invention is not concerned with this alternative form of illumination but rather with the episcopic illumination to be described later. Light from the object either diascopically or espiscopically illuminated is reflected by a mirror 13 through a relay lens system made up of lenses 16 and 17 optically separated by the sum of their focal lengths. A mirror 18, oblique to the optic axis, is included to reflect the light from the lens 16 to the lens 17, all of which acts to form an aerial image 19 of the object 12. This aerial image is picked up by an objective 21 (or alternatively by other objectives 22 or 23 mounted on the same lens turret) and then by means of a plane mirror 26 is directed into focus on a rear projection screen 27.

Figure 2:
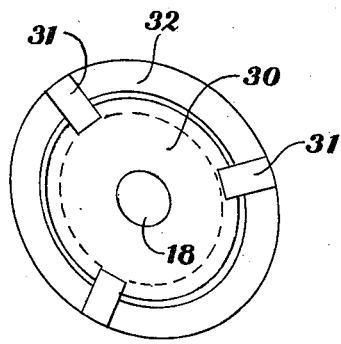
Fig. 2 shows the spot mirror used in Fig. 1.

According to the invention the mirror 18 is a small spot, circular as seen along the optic axis of either the lens 16 or the lens 17, but actually elliptical as shown in Fig. 2 since it is oblique to the optic axes of the lenses 16 and 17. The area of the spot mirror 18 is less than that of the lens 16 and it is located in the common focal plane of the lenses 16 and 17 so that it acts as a telecentric stop for the lenses, particularly with reference to the lens 16.

In the embodiment shown the mirror 18 consists of a metallic coating on an elliptical sheet of glass 30 held by clamps 31 in a mount 32. Further according to the invention a lamp 36 and condenser lens 37 provides a beam of light which is reflected by a mirror 38 annularly around the spot mirror 18 and through the lens 16 to illuminate the object 12 episcopically.

The lenses 21, 22 and 23 provide different magnifications and may be of the type described in U. S. Patent 2,600,805 to Reiss.

These lenses, as shown in more detail in Figs. 3, 4 and 5 are mounted on a sector turret 40 pivoted about a point or bearing 41. The turret may be operated manually but in the preferred embodiment shown it is motor driven. A sprocket 46 engages a chain 47 which is resiliently attached by springs 48 to the sides of the sector turret 40. The purpose of the springs 48 is two-fold. One purpose is to take up any shock and apply pressure against the positive stop 65, 66, 67 or 68 as the turret comes to rest and the other is to take up the slack in the chain 47 as the turret moves to the extreme positions.

Precision is assured by a barrel-shaped detent 60 which may be held in either the position indicated as 60 or the position indicated by broken lines 61. Projections 65, 66, 67, and 68 on the turret 40 engage the detent 60. The lens 21 may have a magnification of 10× and the lenses 22 and 23 may respectively have magnifications of 50× and 100×. It is customary on any one particular job to switch back and forth between the low magnification and one or other of the high magnifications but rarely is it necessary to use both of the high magnifications on any one job. Accordingly, the detent 60 is normally left in either the upper or lower position. When in the upper position (61) the turret is moved back and forth between the points in which the detent engages the projection 65 or 66 so that lenses 21 and 22 are alternatively brought into operative position. When the detent is in the lower position (60), the turret is driven back and forth with the detent 60 between the projections 67 and 68 so that lenses 21 and 23 are alternatively brought into operative position. Simple switches 75 operated by a member 76 disconnect the motor which is driving the sprocket 46 just before the detent 60 engages one of the projections 65 to 68 inclusive so as to eliminate unnecessary shock. The sprocket 46 through a shaft 47 is driven by a worm gear 52 which in turn is driven by a worm 53 on a two-way motor 54. The detent 60 may be moved from one position to the other manually or by any simple arrangement. The particular arrangement shown has the detent 60 mounted on a gimbal 71 which through a series of linkages is operated by solenoids 70. Suitable electrical connections not shown insure that the operation of the motor 54 is always in the direction which moves the particular projection engaging the detent 60 away from that detent.

I claim:

1. An optical system for illuminating an object episcopically and for telecentrically projecting an image thereof onto a screen, comprising means for supporting the object, a screen, a lens system for forming an image of the object on the screen which lens system includes an objective for receiving light from the object when so supported, a reflector positioned oblique to the optic axis of the objective at the rear focal plane thereof to reflect the axial portion of the beam of light from the objective along the path to the screen, means for supporting said reflector centrally in the beam without substantially interfering with the transmission of light around the reflector and lamp means for sending a beam of light behind the reflector annularly around the reflector and through the objective to illuminate the object episcopically, the area of the oblique reflector being less than that of the objective, said reflector acting as the telecentric stop of the objective.

2. An optical system according to claim 1 in which said reflector supporting means is a sheet of transparent glass on which the reflector is a metal coated area elliptical in shape.

References Cited in the file of this patent

UNITED STATES PATENTS

| | | |
|---|---|---|
| 1,687,946 | Massiot | Oct. 16, 1928 |
| 1,812,765 | Astafiev | June 30, 1931 |
| 1,919,022 | Hillman | July 18, 1933 |
| 2,035,780 | Beardsley et al. | Mar. 31, 1936 |
| 2,061,378 | Henze et al. | Nov. 17, 1936 |
| 2,552,238 | Turner et al. | May 8, 1951 |
| 2,552,272 | Fultz | May 8, 1951 |
| 2,552,280 | Hudak | May 8, 1951 |